US008742973B1

(12) United States Patent
Fersdahl (10) Patent No.: US 8,742,973 B1
(45) Date of Patent: Jun. 3, 2014

(54) SYSTEM AND METHOD OF DETERMINING INCREASED TURBULENCE SUSCEPTIBILITY WITH ELAPSED FLIGHT TIME (75) Inventor: Mark C. Fersdahl, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 13/240,555

(22) Filed: Sep. 22, 2011

(51) Int. Cl.
*G01S 13/00* (2006.01)
*G06F 17/00* (2006.01)
*G06F 19/00* (2011.01)

(52) U.S. Cl.
USPC .............. 342/26 B; 342/26 R; 701/3; 701/14

(58) Field of Classification Search
USPC ................ 342/26 R, 26 A, 26 B, 26 C, 26 D; 701/3–18
See application file for complete search history.

(56) References Cited

U.S. PATENT DOCUMENTS

| 3,691,356 | A | * | 9/1972 | Miller | 701/15 |
|---|---|---|---|---|---|
| 3,908,934 | A | * | 9/1975 | Schloeman | 244/182 |
| 4,184,327 | A | * | 1/1980 | Cornett et al. | 60/240 |
| 4,649,388 | A | * | 3/1987 | Atlas | 342/26 D |
| 4,835,536 | A | * | 5/1989 | Piesinger et al. | 342/26 D |
| 4,924,401 | A | * | 5/1990 | Bice et al. | 701/6 |
| 5,130,712 | A | * | 7/1992 | Rubin et al. | 342/26 D |
| 5,175,551 | A | * | 12/1992 | Rubin | 342/26 D |
| 5,208,600 | A | * | 5/1993 | Rubin | 342/2 D |
| 5,311,183 | A | * | 5/1994 | Mathews et al. | 342/26 B |
| 5,359,330 | A | * | 10/1994 | Rubin et al. | 342/26 D |
| 5,568,151 | A | * | 10/1996 | Merritt | 342/192 |
| 5,639,964 | A | * | 6/1997 | Djorup | 73/170.12 |
| 6,381,538 | B1 | * | 4/2002 | Robinson et al. | 701/439 |
| 6,578,794 | B1 | * | 6/2003 | Clark et al. | 244/75.1 |
| 6,650,972 | B1 | * | 11/2003 | Robinson et al. | 701/3 |
| 6,828,922 | B1 | * | 12/2004 | Gremmert et al. | 340/949 |
| 6,917,860 | B1 | * | 7/2005 | Robinson et al. | 701/3 |
| 7,109,912 | B1 | * | 9/2006 | Paramore et al. | 342/26 B |
| 7,242,343 | B1 | * | 7/2007 | Woodell | 342/26 B |
| 7,292,178 | B1 | * | 11/2007 | Woodell et al. | 342/26 B |
| 7,307,576 | B1 | * | 12/2007 | Koenigs | 342/26 R |
| 7,417,579 | B1 | * | 8/2008 | Woodell | 342/26 B |
| 7,471,995 | B1 | * | 12/2008 | Robinson | 701/3 |
| 7,696,921 | B1 | * | 4/2010 | Finley et al. | 342/26 B |
| 7,761,197 | B2 | * | 7/2010 | Puig | 701/14 |
| 7,917,255 | B1 | * | 3/2011 | Finley | 701/9 |
| 8,109,464 | B2 | * | 2/2012 | Bhargava | 244/63 |
| 2002/0066829 | A1 | * | 6/2002 | DeWitt et al. | 244/181 |
| 2005/0261811 | A1 | * | 11/2005 | Artini et al. | 701/3 |
| 2006/0036366 | A1 | * | 2/2006 | Kelly et al. | 702/3 |
| 2007/0260366 | A1 | * | 11/2007 | Lacaze et al. | 701/3 |
| 2008/0021601 | A1 | * | 1/2008 | Puig | 701/14 |
| 2008/0300736 | A1 | * | 12/2008 | Tarleton et al. | 701/3 |
| 2009/0062973 | A1 | * | 3/2009 | Caldeira et al. | 701/6 |
| 2009/0072080 | A1 | * | 3/2009 | Bhargava | 244/58 |
| 2009/0132106 | A1 | * | 5/2009 | DeJonge | 701/15 |
| 2010/0188283 | A1 | * | 7/2010 | Kemkemian et al. | 342/26 B |
| 2010/0245164 | A1 | * | 9/2010 | Kauffman | 342/26 B |
| 2010/0245165 | A1 | * | 9/2010 | Kauffman et al. | 342/26 B |
| 2010/0302073 | A1 | * | 12/2010 | Fernandez | 340/959 |

(Continued)

*Primary Examiner* — Peter Bythrow
(74) *Attorney, Agent, or Firm* — Donna P. Suchy; Daniel M. Barbieri (57) ABSTRACT

An aircraft based radar system is provided. The radar system includes processing electronics configured to estimate a vertical loading on the aircraft using radar return data and a time value.

20 Claims, 7 Drawing Sheets

(56) References Cited

U.S. PATENT DOCUMENTS

| | | | |
|---|---|---|---|
| 2011/0125503 A1* | 5/2011 | Dong et al. | 704/275 |
| 2011/0184623 A1* | 7/2011 | De Boer | 701/99 |
| 2012/0006935 A1* | 1/2012 | Bhargava | 244/50 |

* cited by examiner

SYSTEM AND METHOD OF DETERMINING INCREASED TURBULENCE SUSCEPTIBILITY WITH ELAPSED FLIGHT TIME

BACKGROUND

The present disclosure relates generally to the field of airborne radar systems. The present disclosure more specifically relates to sensing and detecting the inference of increased turbulence susceptibility with elapsed flight time.

In general, airborne weather radars detect turbulence by measuring Doppler spectral width. This radar observable spectral width correlates to the magnitude of the turbulence; however, the spectral width is an environmental parameter, which does not vary from aircraft to aircraft. In addition to spectral width, the turbulence magnitude experienced by the crew, passengers, and aircraft is dependent on the aircraft's dynamic response to the wind field. The dynamic response varies with aircraft type, aircraft speed, aircraft weight, aircraft altitude, and other flight conditions. In some installations, however, aircraft dependent parameters, such as weight and aircraft type are not available to the radar. Thus, there is a need to provide accurate turbulence information and alerts that do not rely on aircraft specific data. Further, there is a need to provide turbulence information that does not rely on high-fidelity aerodynamic data and pilot in the loop simulation methodologies, which can be a significant cost source. Further still, there is a need for a system for and a method of inferring of increased turbulence susceptibility with elapsed flight time.

SUMMARY

One embodiment relates to an aircraft based radar system. The radar system includes processing electronics configured to estimate a vertical loading on the aircraft using radar return data and a time value.

Another embodiment relates to a method for indicating susceptibility of an aircraft to turbulence. The method includes calculating a spectral width parameter from radar return data and estimating a vertical loading on the aircraft using the spectral width parameter and a T factor, the T factor being a function of time.

Another embodiment relates to a turbulence detection and display system. The system includes a means for a receiving a time signal, a spectral width parameter signal, an altitude signal, and an airspeed signal. The system further includes a means for determining a signal representative of the presence of a turbulence threat based on radar data and the time signal, the altitude signal, and the airspeed signal.

DETAILED DESCRIPTION

Referring generally to the FIGURES, systems and methods for inferring increased turbulence susceptibility with time are described. A weather radar system is generally configured to project radar beams and to receive radar returns relating to the projected radar beams. Using the return data, processing electronics associated with the weather radar system can distinguish between types of weather (e.g., rain, snow, etc.) and terrain (e.g., a mountain, a building). In the case of weather returns, the particles of precipitation have a distribution of velocities. For example, depending on downdrafts, updrafts, and other winds, some of the rain can fall straight down, towards the aircraft, away from the aircraft, side-to-side, upwards, or any combination thereof. The processing electronics can process this distribution of velocities (e.g., calculate a standard deviation or variance of the velocities) to generate a spectral width parameter. The spectral width parameter can then be used to calculate turbulence in terms of aircraft vertical g-loading. A time parameter (e.g., time value, elapsed flight time, T factor, time signal, etc.) may be used to provide a more accurate estimate of vertical loading on the aircraft. The elapsed flight time may be from a phase of flight (e.g., completion of initial climb enroute cruise, etc.) or cumulative from takeoff. The T factor may be a function of time and may be calibrated in-flight to provide an even more accurate estimate of vertical loading on the aircraft. The systems and methods described herein may provide for improved inference of increased turbulence susceptibility with time. According to various embodiments, the time parameter may comprise a plurality of time sub-parameters, for example, a first time sub-parameter for elapsed time during climbs and a second time sub-parameter for elapsed time during cruise and/or descents.

Figure 1:
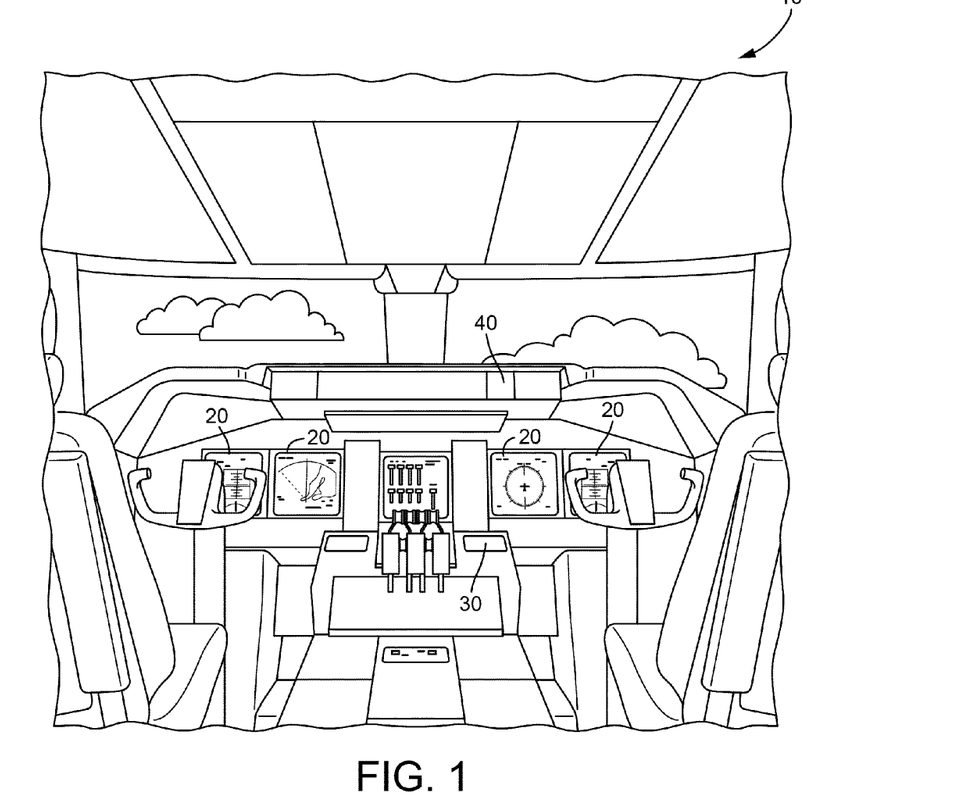
FIG. 1 is a schematic illustration of an aircraft control center, according to an exemplary embodiment.

Referring now to FIG. 1, an illustration of an aircraft control center or cockpit 10 is shown, according to an exemplary embodiment. Aircraft control center 10 includes flight displays 20 which are generally used to increase visual range and to enhance decision-making abilities. In an exemplary embodiment, flight displays 20 may provide an output from a radar system of the aircraft. For example, flight displays 20 may provide a top-down view, a horizontal view, or any other view of weather and/or terrain detected by a radar system on the aircraft. The views of weather may include monochrome or color graphical representations of the weather. Graphical representations of weather may include an indication of altitude of those objects or the altitude relative to the aircraft. Aircraft control center 10 may further include other user interface elements such as an audio device 30 (e.g., speaker, electro-acoustic transducer, etc.) and illuminating or flashing lamps 40.

Figure 2:
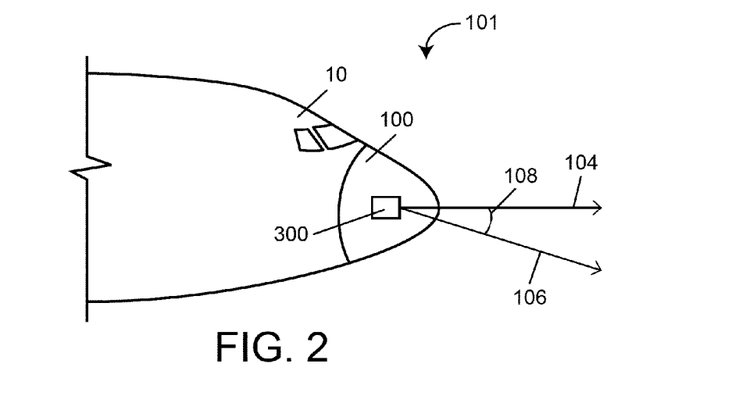
FIG. 2 is a schematic illustration of the nose of an aircraft including a weather radar system, according to an exemplary embodiment.

Referring to FIG. 2, the front of an aircraft 101 is shown with aircraft control center 10 and nose 100, according to an exemplary embodiment. A radar system 300 (e.g., a weather radar system or other radar system) is generally located within nose 100 of aircraft 101 or within aircraft control center 10 of aircraft 101. According to various exemplary embodiments, radar system 300 may be located on the top of aircraft 101 or on the tail of aircraft 101 instead. Radar system 300 may include or be coupled to an antenna system. A variety of different antennas or radar systems may be used with the present invention (e.g., a split aperture antenna, a monopulse antenna, a sequential lobbing antenna, phased array, etc.).

Radar system 300 generally works by sweeping a radar beam horizontally back and forth across the sky. Some radar systems will conduct a first horizontal sweep 104 directly in front of aircraft 101 and a second horizontal sweep 106 downward at some tilt angle 108 (e.g., 20 degrees down). Returns from different tilt angles can be electronically merged to form a composite image for display on an electronic display shown, for example, in FIG. 1. Returns can also be processed to, for example, distinguish between terrain and weather, to determine the height of terrain, or to determine the height of weather. Radar system 300 may be a WXR-2100 Multi-Scan™ radar system or similar system manufactured by Rockwell Collins. According to other embodiments, radar system 300 may be an RDR-4000 system or similar system manufactured by Honeywell International, Inc. Radar system 300 may include a terrain awareness and warning system (TAWS) and coordinate with associated user interface elements in aircraft control center 10 (e.g., flashing lights 40, displays 20, display elements on a weather radar display, display elements on a terrain display, audio alerting devices 30, etc.) configured to warn the pilot of potentially threatening terrain features.

According to an exemplary embodiment, radar system 300 transmits and receives multiple pulses, which may be utilized to determine a radar observed parameter called spectral width. Spectral width is an environmental parameter only. A more useful parameter can be calculated that takes into account the effect of the environment on aircraft 101. In an exemplary embodiment, a time parameter is used in an algorithm or software routine within processing electronics 304 (see FIG. 3) to scale the spectral width parameter by the dynamic response of aircraft 101. The time parameter may be determined from a hardware or software timer on-board aircraft 101 (e.g., within radar system 300, processing electronics 304, the flight management system, etc.). Alternatively, the time parameter may be determined from a source external to aircraft 101 (e.g., a UTC label received by radar system 300 or a global positioning satellite system (GPS) receiver). The algorithm may further take into consideration other parameters (e.g., airspeed, throttle position, altitude, and/or air pressure). In an exemplary embodiment, the time parameter is a function which may be calibrated or modified in order to better correlate actual turbulence to predicted turbulence.

Figure 3:
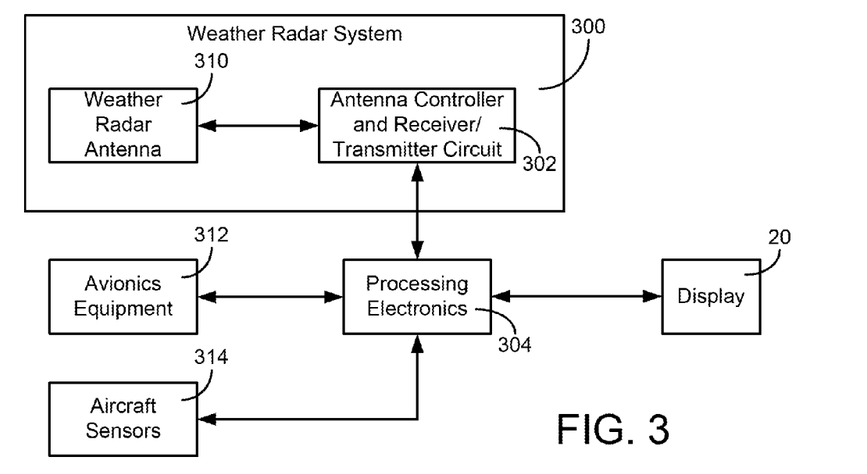
FIG. 3 is a block diagram of a weather radar system, according to an exemplary embodiment.

Referring to FIG. 3, a block diagram of a weather radar system 300 is shown, according to an exemplary embodiment. Weather radar system 300 is shown to include a weather radar antenna 310 connected (e.g., directly, indirectly) to an antenna controller and receiver/transmitter circuit 302. Antenna controller and receiver/transmitter circuit 302 may include any number of mechanical or electrical circuitry components or modules for steering a radar beam. For example, circuit 302 may be configured to mechanically tilt the antenna in a first direction while mechanically rotating the antenna in a second direction. In other embodiments, a radar beam may be electronically swept along a first axis and mechanically swept along a second axis. In yet other embodiments, the radar beam may be entirely electronically steered (e.g., by electronically adjusting the phase of signals provided from adjacent antenna apertures, etc.). Circuit 302 may be configured to conduct the actual signal generation that results in a radar beam being provided from weather radar antenna 310 and to conduct the reception of returns received at radar antenna 310. Radar return data is provided from circuit 302 to processing electronics 304 for processing. For example, processing electronics 304 can be configured to interpret the returns for display on display 20.

Processing electronics 304 can also be configured to provide control signals or control logic to circuit 302. For example, depending on pilot or situational inputs, processing electronics 304 may be configured to cause circuit 302 to change behavior or radar beam patterns. In other words, processing electronics 304 may include the processing logic for operating weather radar system 300. It should be noted that processing electronics 304 may be integrated into radar system 300 or located remotely from radar system 300, for example, in aircraft control center 10.

Processing electronics 304 are further shown as connected to aircraft sensors 314 which may generally include any number of sensors configured to provide data to processing electronics 304. For example, sensors 314 could include temperature sensors, humidity sensors, infrared sensors, altitude sensors, a gyroscope, a global positioning system (GPS), or any other aircraft-mounted sensors that may be used to provide data to processing electronics 304. It should be appreciated that sensors 314 (or any other component shown connected to processing electronics 304) may be indirectly or directly connected to processing electronics 304. Processing electronics 304 are further shown as connected to avionics equipment 312. Avionics equipment 312 may be or include a flight management system, a navigation system, a backup navigation system, or another aircraft system configured to provide inputs to processing electronics 304.

Figure 4:
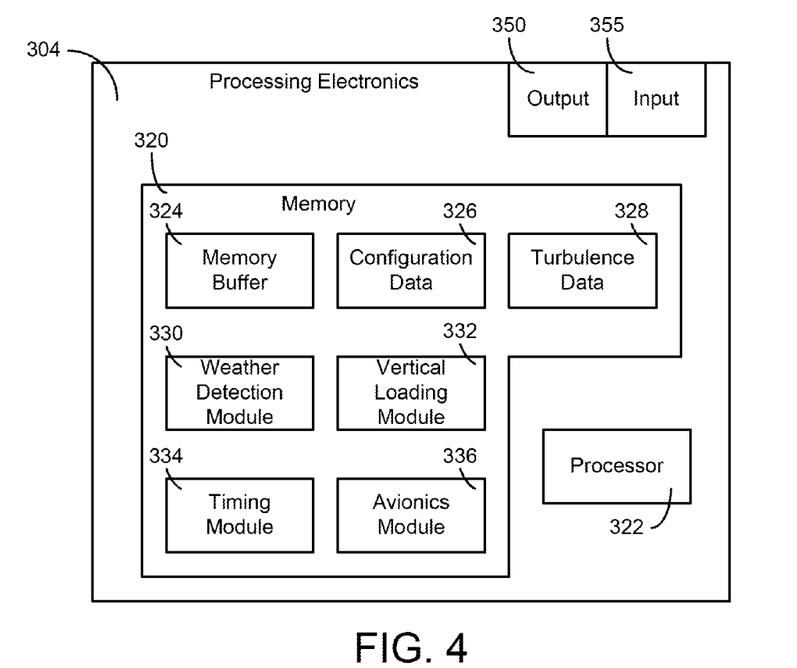
FIG. 4 is a block diagram of the processing electronics of the weather radar system of FIG. 3, according to an exemplary embodiment.

Referring to FIG. 4, a detailed block diagram of processing electronics 304 of FIG. 3 is shown, according to an exemplary embodiment. Processing electronics 304 includes a memory 320 and processor 322. Processor 322 may be or include one or more microprocessors, an application specific integrated circuit (ASIC), a circuit containing one or more processing components, a group of distributed processing components, circuitry for supporting a microprocessor, or other hardware configured for processing. According to an exemplary embodiment, processor 322 is configured to execute computer code stored in memory 320 to complete and facilitate the activities described herein. Memory 320 can be any volatile or non-volatile memory device capable of storing data or computer code relating to the activities described herein. For example, memory 320 is shown to include modules 330-336 which are computer code modules (e.g., executable code, object code, source code, script code, machine code, etc.) configured for execution by processor 322. When executed by processor 322, processing electronics 304 is configured to complete the activities described herein. Processing electronics 304 includes hardware circuitry for supporting the execution of the computer code of modules 330-336. For example, processing electronics 304 includes hardware interfaces (e.g., output 350) for communicating control signals (e.g., analog, digital) from processing electronics 304 to circuit 302 or to display 20. Processing electronics 304 may also include an input 355 for receiving, for example, radar return data from circuit 302, feedback signals from circuit 302 or for receiving data or signals from other systems or devices.

Memory 320 includes a memory buffer 324 for receiving radar return data. The radar return data may be stored in memory buffer 324 until buffer 324 is accessed for data. For example, a weather detection module 330, an object detection module, a forward looking terrain alerting algorithm, or another process that utilizes radar return data may access buffer 324. The radar return data stored in memory 320 may be stored according to a variety of schemes or formats. For example, the radar return data may be stored in an x,y or x,y,z format, a heading-up format, a north-up format, a latitude-longitude format, or any other suitable format for storing spatial-relative information.

Memory 320 further includes configuration data 326. Configuration data 326 includes data relating to weather radar system 300. For example, configuration data 326 may include beam pattern data which may be data that a beam control module can interpret to determine how to command circuit 302 to sweep a radar beam. For example, configuration data 326 may include information regarding maximum and minimum azimuth angles of horizontal radar beam sweeps, azimuth angles at which to conduct vertical radar beam sweeps, timing information, speed of movement information, and the like.

Memory 320 further includes turbulence data 328. Turbulence data 328 includes data relating to inferring vertical loading on aircraft 101 in response to spectral width. For example, turbulence data 328 may include turbulence data which may be data that vertical loading module 332 can interpret to estimate how aircraft 101 will respond to a turbulence event. For example, turbulence data 328 may store aircraft actual turbulence performance characteristics during a turbulence event, processing electronics 304 estimated turbulence, a comparison of processing electronics 304 estimated turbulence versus actual turbulence performance characteristics, actual turbulence performance characteristics versus a time parameter, estimated turbulence versus elapsed flight time, altitude, airspeed, weight, time of day, time of year and/or any other turbulence data known to a person skilled in the art. For example, estimated vertical loading may be stored in a plurality of spectral width versus time look up tables, the plurality organized by altitude and/or airspeed; or estimated vertical g-loading may be stored in a four-dimensional array of spectral width, time, airspeed, and altitude.

Memory 320 is further shown to include a weather detection module 330 which includes logic for using radar returns in memory buffer 324 to conduct one or more determinations relating to weather. For example, weather detection module 330 may be configured to determine a spectral width parameter from the radar returns. Weather detection module 330 may further be configured to distinguish terrain returns from weather returns. Weather detection module 330 may be configured to determine when weather is hazardous, determine characteristics of weather (e.g., growth rate, lightning, type of precipitation, etc.), or to conduct any other processing steps (e.g., filtering) relative to radar return data used for weather display or warning in aircraft 101.

Memory 320 is further shown to include a vertical loading module 332 which includes logic for using the spectral width parameter from weather detection module 330 and a time parameter from timing module 334 to estimate vertical g-loading on aircraft 101. For example, vertical loading module 332 may calculate vertical loading as a function of the spectral width parameter, the time parameter, altitude, and/or airspeed. Vertical loading module 332 may use the spectral width parameter, the time parameter, altitude, air pressure, airspeed, throttle position, and/or other parameters to retrieve an estimated vertical g-loading from turbulence data 328. For example, vertical loading module 332 may be configured to determine a gain level or other display setting for display of the radar returns on a weather radar display. Vertical loading module 332 may store or retrieve turbulence estimates to turbulence data 328.

Memory 320 is further shown to include a timing module 334 which includes logic for determining a time parameter. For example, timing module 334 may be configured to generate an elapsed flight time from a hardware or software timer or from a UTC label received from weather radar system 300 or a GPS receiver. The timer may be a count-up timer (e.g., time increasing from the early stages of flight, zero being proximate takeoff, etc.) or a count-down timer (e.g., time decreasing from the early stages of flight, zero being proximate an estimated time of arrival, etc.). The elapsed flight time may be from a particular phase of flight (e.g., completion of initial climb, beginning enroute cruise, etc.), and timing module 334 may be configured to determine phase of flight from information received from avionics module 336. For example, timing module 334 may be configured to calculate a T factor, the T factor being a function of time. Timing module 334 may be configured to calibrate the T factor function in response to actual vertical loading measurements or to receive updated constants or coefficients of the T factor function from vertical loading module 332, avionics module 336, or other module. Timing module 334 may be configured to adapt the T factor function to a different function (e.g., through curve fitting, adaptation logic, etc.) to more accurately correlate a spectral width parameter to actual vertical g-loading on aircraft 101.

Memory 320 is further shown to include avionics module 336, which may include logic for receiving and interpreting sensor readings (e.g., altitude, airspeed, fuel level, fuel burn rate, etc.) and controls inputs (e.g., throttle position, flaps position, etc.). Avionics module 336 may include logic for exchanging information between aircraft systems and subsystems. For example, avionics module 336 may receive sensor readings from a sensor and provide sensor data to vertical loading module 332 or timing module 334. Avionics module 336 may include logic for, or communicate with other modules that are configured for, communications, navigation, flight control systems, weather, etc. (e.g., weather detection module 330). For example, avionics module 336 may receive radar return data from weather radar system 300 or memory buffer 324.

In an exemplary embodiment, processing electronics 304 may determine a signal representative of turbulence by receiving data related to the radar return information. For example, radar system 300 can measure reflectivity, velocity and/or variations in Doppler velocity through the radio frequency waves returning to aircraft 101 from clouds, rain, snow, or other precipitation. Processing electronics 304 can calculate a spectral width parameter, $\sigma\_spectralwidth$, which correlates to the variations in Doppler velocity. The spectral width parameter may be converted to a vertical load, $\sigma\_load$, which correlates to an acceleration in the vertical direction of aircraft 101. According to one exemplary embodiment, $\sigma\_load$ is an integrated root mean square ("RMS") over five (5) seconds and can be, for example, eighty (80) to one hundred thirty-five (135) pounds per square inch.

According to one embodiment, $\sigma\_load = f(\sigma\_spectralwidth, time)$, where the vertical loading on aircraft 101 is a function ("f") of the spectral width parameter and time. According to another embodiment, $\sigma\_load = f(\sigma\_spectralwidth, time, altitude, airspeed)$, where the vertical loading on aircraft 101 is a function of the spectral width parameter, time, altitude, and airspeed. The vertical loading of these embodiments may be calculated or retrieved from a look up table or other data structure. According to yet another embodiment, the vertical loading may be a function ("F") of the spectral width parameter, altitude, air pressure, throttle position and/or airspeed modified by a parameter ("T"), where T is a constant or a linear or non-linear function of time. In one embodiment, σ_load=F(σ_spectralwidth)*T(time). For example, according to one embodiment, T may be a linear function of time t: T=Kt+C, where K and C are constants. The constants and/or exponents of the T function may be calibrated in-flight to provide an even more accurate estimate of vertical loading on aircraft 101. The vertical loading estimation may be output as a signal representative of turbulence.

Processing electronics 304 may be configured to compare σ_load to a threshold value. The threshold value may depend on various parameters, for example, the size of aircraft 101, the weight of aircraft 101, and/or the sensitivity of the payload of aircraft 101 (e.g., passengers versus cargo). According to one embodiment, if the σ_load value exceeds a threshold value, then the turbulence is displayed on display 20. According to another embodiment, if the σ_load value does not exceed a threshold value, then the turbulence is not displayed on display 20. According to another embodiment, if the σ_load is greater than or equal to the threshold value, then processing electronics 304 may annunciate an alert (e.g., transmit an alert to display 20, audio device 30, and/or lamps 40). According to yet another embodiment, if the σ_load is less than the threshold value, then processing electronics 304 transmits a signal representative of turbulence. In this exemplary embodiment, the signal representative of turbulence can include no turbulence objects, advisory turbulence objects, turbulence objects, or any combination thereof.

Figure 5:
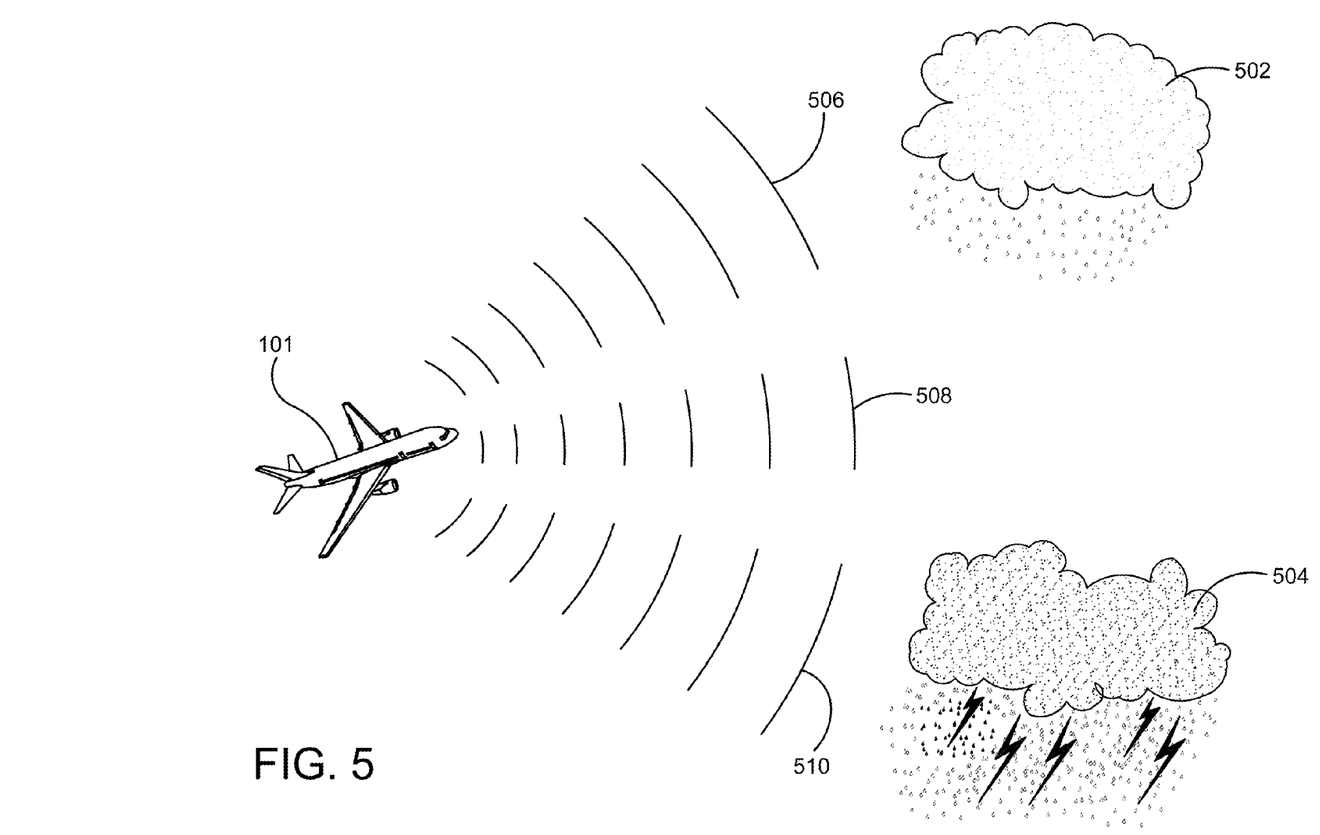
FIG. 5 is a schematic illustration of an aircraft radar system identifying potential turbulence activity, according to an exemplary embodiment.

Referring to FIG. 5, an illustration of an aircraft radar system 300 identifying potential turbulence activity is shown, according to an exemplary embodiment. In the exemplary embodiment shown, aircraft 101 utilizing radar system 300 transmits first (e.g., left, upper, etc), second (e.g., center, horizontal, etc.), and third (e.g., right, lower, etc.) radio frequency waves, shown as left radio frequency wave 506, center radio frequency wave 508, and right radio frequency wave 510, respectively. It should be noted that, while radio frequency waves are described, radar system 300 may use other beam types (e.g., microwave, Lidar, etc.).

In this exemplary embodiment, left radio frequency wave 506 contacts turbulence source 502 and reflects back to aircraft 101 as a radar return. Processing electronics 304 calculate a spectral width of the radar return data from turbulence source 502. Processing electronics 304 may then use the spectral width parameter, a time parameter, and other inputs to estimate the vertical g-loading on aircraft 101 if aircraft 101 were to fly through turbulence source 502. Similarly, right radio frequency wave 510 reflects back from turbulence source 504, and processing electronics 304 estimate a vertical g-loading on aircraft 101 based on a spectral width of radar return data from turbulence source 504, a time parameter, and other inputs. Center radio frequency wave 508 does not contact a turbulence source. As will be discussed in further detail below, these estimates of turbulence may be stored as turbulence data 328 for later comparison with actual turbulence experienced by aircraft 101.

Figure 6A:
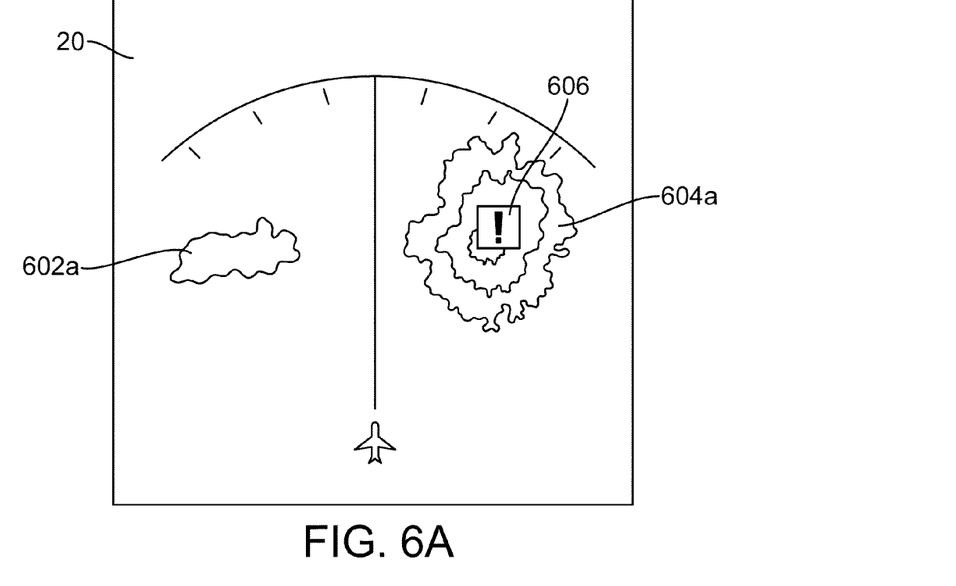
FIGS. 6A-B are schematic illustrations of an aviation display showing turbulence susceptibility with elapsed flight time, according to an exemplary embodiment.
Figure 6B:
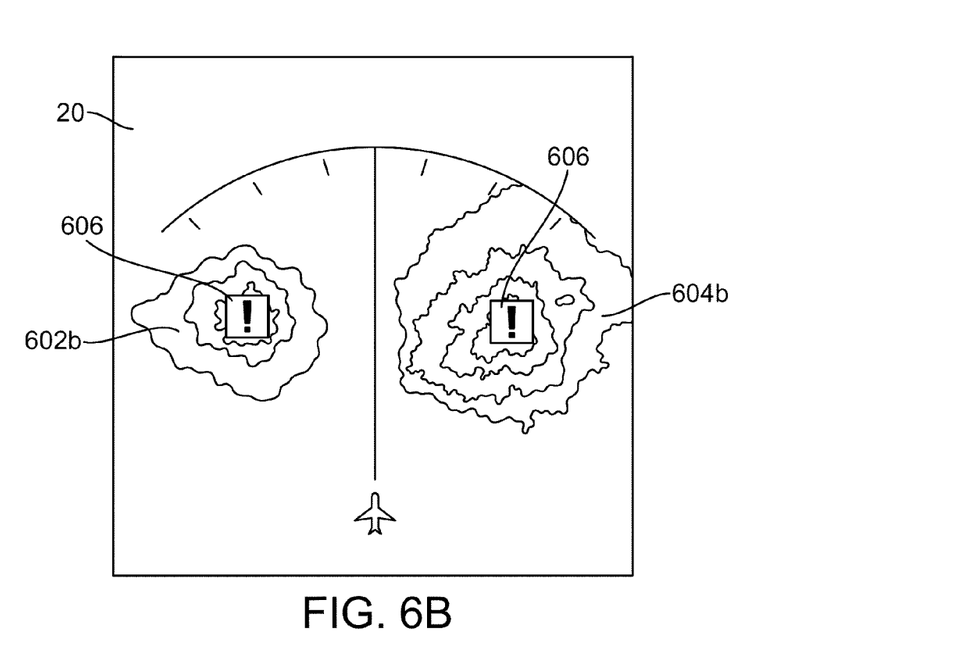

Further referring to FIGS. 6A and 6B, illustrations of an aviation display 20 showing turbulence susceptibility with elapsed flight time are shown, according to an exemplary embodiment. Processing electronics 304 may be configured to cause display 20 to show no hazard, an advisory alert, a caution alert, turbulence source 502, turbulence source 504, and/or any combination thereof. In the exemplary embodiment shown in FIG. 6A, the elapsed flight time is relatively short, for example, after completion of the initial climb or reaching cruising altitude. In this state, the aircraft may be fully loaded with fuel and payload and, therefore, less susceptible to turbulence. In the exemplary embodiment shown in FIG. 6B, the elapsed flight time is relatively long, for example, during initial descent. In this state, the aircraft may be low on fuel and may have dropped its payload and, therefore, be more susceptible to turbulence.

According to the embodiments shown, images 602a and 602b correlate to turbulence source 502, and images 604a and 604b correlate to turbulence source 504. As shown in both FIGS. 6A and 6B, the estimated vertical loading on aircraft 101 from turbulence source 504 exceeds a threshold value regardless of elapsed flight time. Accordingly, an alert 606 may be shown over image 604a of turbulence source 504. Alternatively, the alert may be an aural alert, haptic alert, or other visual alert (e.g., flashing lamp 40) in flight control center 10. The increased estimated vertical loading on aircraft 101 with increased elapsed time may also be seen as the larger turbulence region indicated by image 604b than by image 604a.

In contrast, the estimated vertical loading on aircraft 101 from turbulence source 502 is below a threshold value with the shorter elapsed flight time of FIG. 6A, but exceeds a threshold value with a longer elapsed flight time of FIG. 6B. Accordingly, with the greater elapsed flight time of FIG. 6B, turbulence region of turbulence source 502 is shown as a larger image 602b, and an alert 606 may be overlaid on image 602b.

According to various other embodiments, the embodiment of FIG. 6A may be late in the flight (e.g., during descent) and FIG. 6B may be mid-flight (e.g., enroute cruising). In such embodiments, a T-factor used in estimating vertical g-loading on aircraft 101 may use an estimated time to arrival to compensate for lower altitude and lower airspeed and, therefore, increased susceptibility to turbulence during descent. According to one embodiment elapsed time is proportional to fuel burned.

Figure 7:
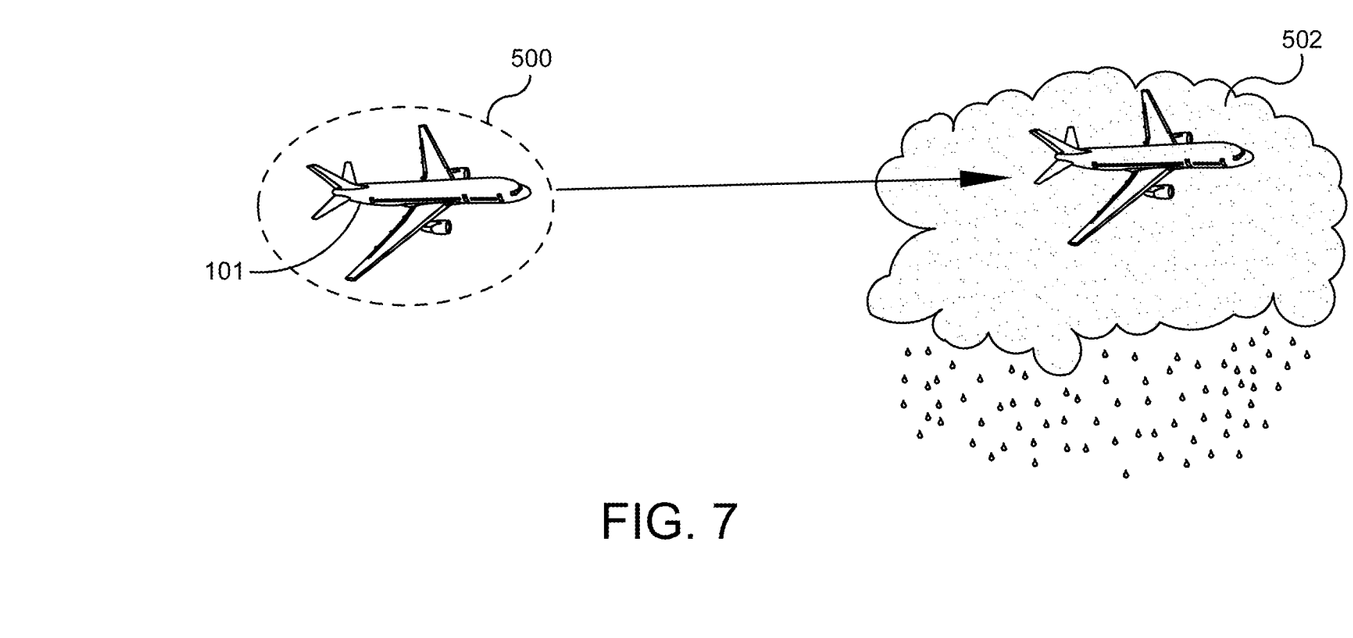
FIG. 7 is a schematic illustration of a turbulence susceptibility calibration procedure, according to an exemplary embodiment.

Referring to FIG. 7, an illustration of a turbulence susceptibility calibration procedure is shown, according to an exemplary embodiment. As discussed above, the time parameter used to estimate vertical g-loading on aircraft 101 may include a T factor. The T factor may be a constant or a linear or non-linear function of time. The constants and/or exponents of the function may be calibrated in-situ to provide an even more accurate estimate of vertical loading on aircraft 101.

According to the embodiment shown in the illustration, aircraft 101 is in a first position 500, which corresponds to the location of aircraft 101 as described in FIG. 5. In position 500, radar system 300 transmits left radio frequency wave 506 towards turbulence source 502. Processing electronic 304 calculates a spectral width of the radar return data from turbulence source 502 and uses the spectral width parameter, a time parameter, and other parameters to estimate the vertical loading on aircraft 101 if aircraft 101 were to fly through turbulence source 502. The estimate of vertical loading may be stored as turbulence data 328.

As shown, aircraft 101 then flies through turbulence source 502. Processing electronics 304 receive or calculate an actual vertical loading experienced by aircraft 101 upon contact with turbulence source 502. According to one embodiment, processing electronics 304 calculate the actual vertical loading from a signal received from one or more accelerometers mounted on aircraft 101. Processing electronics 304 then compare the estimated vertical loading with the actual vertical loading and determine a first delta value (e.g., difference, ratio, etc.) between the estimated vertical loading and the actual vertical loading. Processing electronics 304 may then calibrate the T factor based on the first delta value. For example, if T is a linear function of time, T=Kt+C, processing electronics 304 may change the K and/or C values to improve the correlation between the spectral width parameter and vertical loading on aircraft 101.

Aircraft 101 may then detect another turbulence source and estimate a vertical loading on aircraft 101 resulting from flying through this second turbulence source. Upon flying through this second turbulence source, processing electronics 304 may calculate or receive an actual vertical loading on aircraft 101 and calculate a second delta value between the actual vertical loading on aircraft 101 from the second turbulence source and the estimated vertical loading resulting from the second turbulence source. Processing electronics 304 may then calibrate the T factor based on the second delta value or the first and second delta values. Similarly, subsequent (e.g., third, fourth, etc.) delta values may be calculated and used to further calibrate the T factor to improve the correlation between the spectral width parameter and actual vertical loading on aircraft 101.

According to various embodiments, processing electronics 304 calibrate at least one of radar system 300, processing electronics 304 (e.g., vertical loading module 332, timing module 334, turbulence data 328, etc.), and/or display 20 based on one or more delta values, which may be stored as turbulence data 328. For example, look up tables stored in turbulence data 328 may be modified based on one or more delta values. According to another exemplary embodiment, a discrepancy report is generated based on the comparison of the radar predicted turbulence value and the actual turbulence value.

Figure 8:
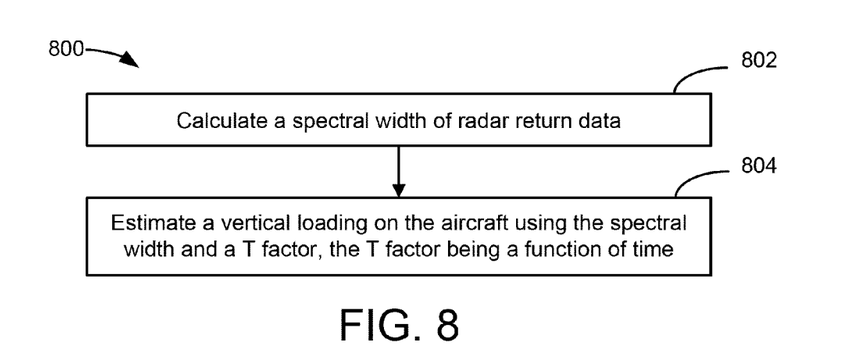
FIG. 8 is a flowchart of a process for indicating susceptibility of an aircraft to turbulence, according to an exemplary embodiment.

Referring to FIG. 8, a flowchart of process 800 for indicating susceptibility of an aircraft to turbulence is shown, according to an exemplary embodiment. Process 800 is shown to include the steps of calculating a spectral width of radar return data (step 802) and estimating a vertical loading on the aircraft using the spectral width and a T factor, the T factor being a function of time (step 804).

Figure 9:
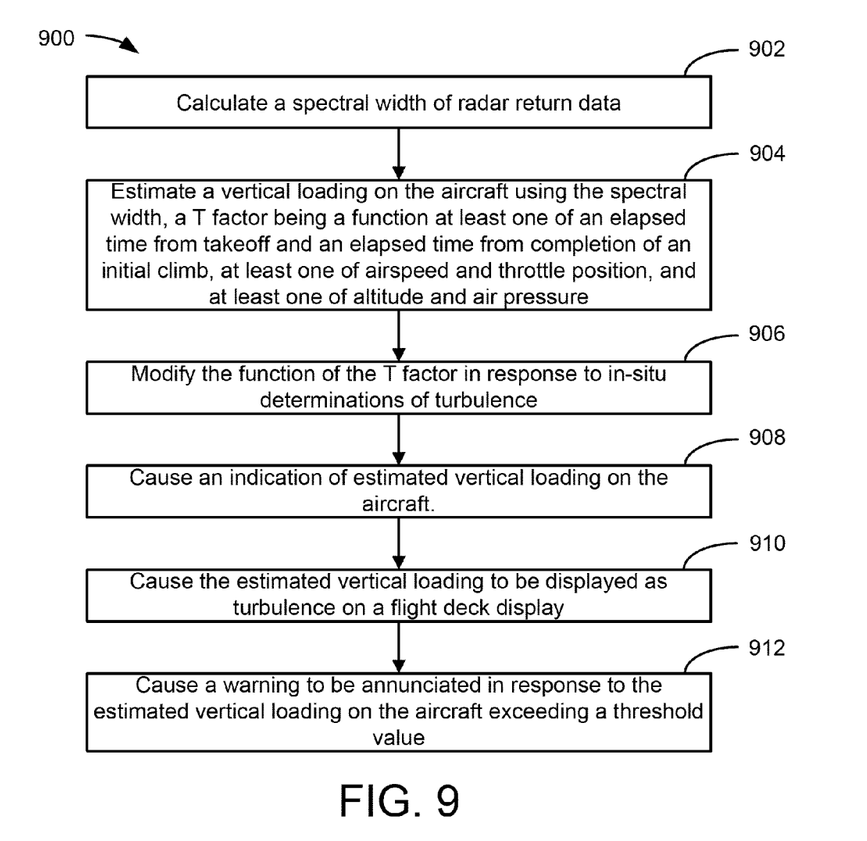
FIG. 9 is a flowchart of a process for indicating susceptibility of an aircraft to turbulence, according to another embodiment.

Referring to FIG. 9, a flowchart of a process 900 for indicating susceptibility of an aircraft to turbulence is shown, according to another embodiment. Process 900 is shown to include the steps of calculating a spectral width of radar return data (step 902) and estimating a vertical loading on the aircraft using the spectral width and a T factor (step 904). The T factor may be a function of at least one of an elapsed time from takeoff and an elapsed time from completion of an initial climb, at least one of airspeed and throttle position, and at least one of altitude and air pressure (step 904). Process 900 is shown to further include the step of modifying the function of the T factor in response to in-situ determinations of turbulence (step 906). Process 900 is shown to further include the steps of causing an indication of estimated vertical loading on the aircraft (step 908), causing the estimated vertical loading to be displayed as turbulence on a flight deck display (step 910), and causing a warning to be annunciated in response to the estimated vertical loading on the aircraft exceeding a threshold value (step 912).

Various alternate embodiments of process 900 are contemplated. Process 900 may not include all of the steps shown. For example, process 900 may not include the step of modifying the function of the T factor in response to in-situ determinations of turbulence (step 906). According to other embodiments, process 900 may include either causing the estimated vertical loading to be displayed as turbulence on a flight deck display (step 910) or causing a warning to be annunciated in response to the estimated vertical loading on the aircraft exceeding a threshold value (step 912). Process 900 may include additional steps. For example, process 900 may include receiving a time value from a timer or a UTC label received by radar system 300 or a GPS system. The steps of process 900 may be performed in various orders. For example, the T factor may be modified (step 906) after the indications of estimated vertical loading have been caused (step 908). According to other embodiments, causing the estimated vertical loading to be displayed as turbulence on a flight deck display (step 910) and causing a warning to be annunciated in response to the estimated vertical loading on the aircraft exceeding a threshold value (step 912) may be performed simultaneously or in reverse order.

Figure 10:
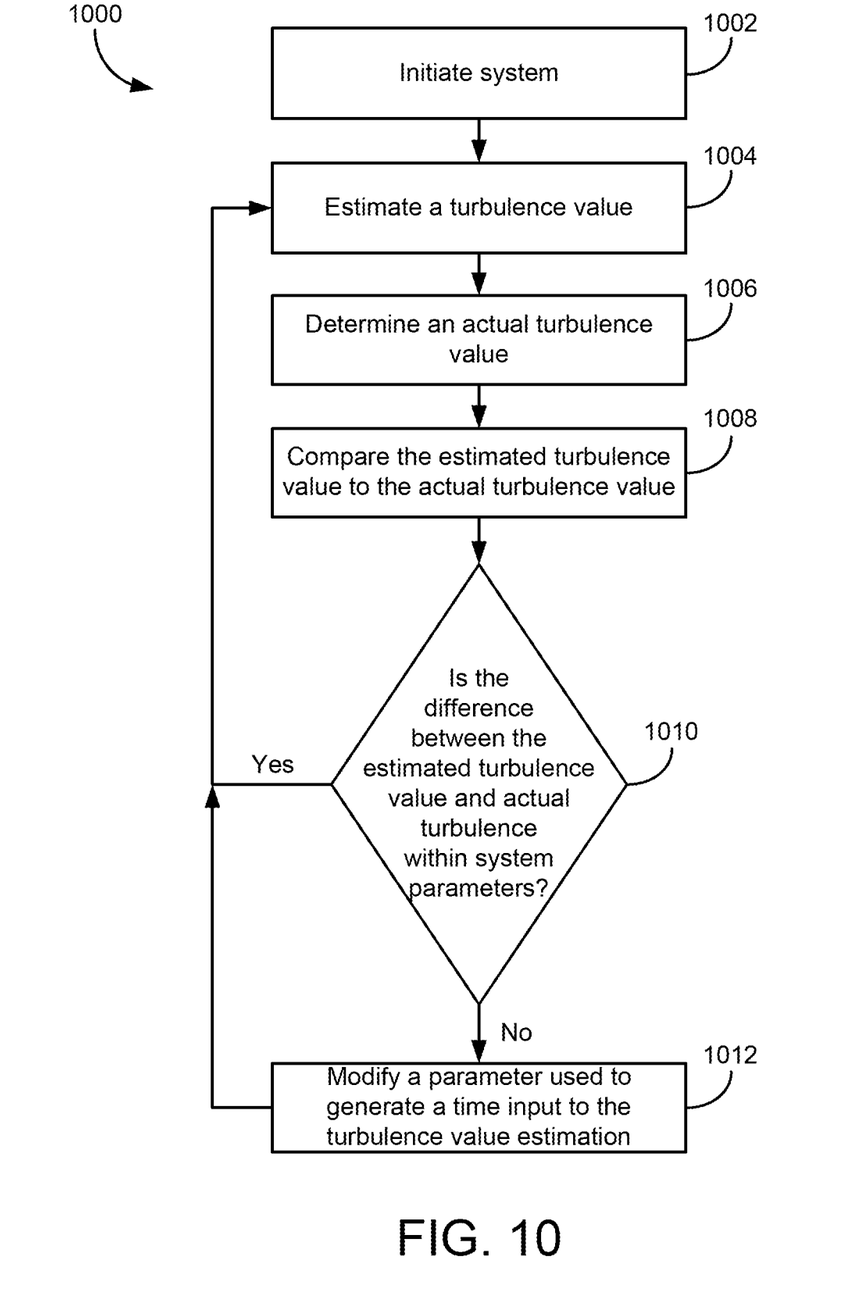
FIG. 10 is a flowchart of a process for calibrating turbulence susceptibility, according to an exemplary embodiment.

Referring to FIG. 10, a flowchart of a process 1000 for calibrating turbulence susceptibility is shown, according to an exemplary embodiment. According to an exemplary embodiment, the system is initiated (step 1002). Process 1000 is shown to include the steps of estimating a turbulence value (step 1004), determining an actual turbulence value (step 1006), and comparing the estimated turbulence value to the actual turbulence value (step 1008). A parameter used to generate a time input to the turbulence value estimation is modified (step 1010) in response to the difference between the estimated turbulence value and the actual turbulence value being outside system parameters (step 1012). According to various embodiments, the parameter used to generate a time input may be a T factor, look up table value, etc.

Various alternate embodiments to process 1000 are contemplated. Process 1000 may not include all of the steps shown. For example, process 1000 may not include the step of initiating the system (step 1002). Process 1000 may include additional steps. For example, process 1000 may include additional steps as described with respect to FIGS. 5-7, (e.g., transmitting a radio frequency wave, receiving radar returns, storing the difference between the estimated turbulence value and actual turbulence value, etc.). It is further contemplated that the difference in step 1012 may be another comparative process (e.g., ratio, etc.).

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures may show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. An aircraft based radar system, comprising:
processing electronics configured to estimate a vertical loading on the aircraft using radar return data and a time parameter defined by a plurality of time sub-parameters, wherein at least two time sub-parameters include an elapsed time from takeoff and an elapsed time from completion of an initial climb, the completion of the initial climb being based on throttle position.

2. The system of claim 1, wherein the processing electronics are further configured to estimate the vertical loading on the aircraft using at least one of airspeed and throttle position.

3. The system of claim 1, wherein the processing electronics are further configured to estimate the vertical loading on the aircraft using at least one of altitude and air pressure.

4. The system of claim 1, wherein the processing electronics are further configured to estimate the vertical loading on the aircraft using a spectral width parameter of the radar return data.

5. The system of claim 1, wherein takeoff is based on throttle position.

6. The system of claim 1, wherein the elapsed time from takeoff is based on sensing of takeoff.

7. The system of claim 1 further comprising a memory configured to store vertical loading estimates based on at least one of airspeed and altitude.

8. A method for indicating susceptibility of an aircraft to turbulence, comprising:
calculating a spectral width parameter from radar return data; and
estimating, with a processing electronics, a vertical loading on the aircraft using the spectral width parameter and a T factor, the T factor being a function of an elapsed time from completion of an initial climb, wherein completion of the initial climb is based on throttle position.

9. The method of claim 8, wherein the T factor is further a function of the elapsed time from takeoff; and wherein takeoff is based on a throttle position.

10. The method of claim 8 further comprising modifying the function of the T factor in response to in-situ determinations of turbulence.

11. The method of claim 8, wherein estimating the vertical loading on the aircraft further comprises using at least one of airspeed and throttle position.

12. The method of claim 8, wherein estimating the vertical loading on the aircraft further comprises using at least one of altitude and air pressure.

13. The method of claim 8 further comprising causing an indication of estimated vertical loading on the aircraft.

14. The method of claim 13 further comprising causing the estimated vertical loading to be displayed as turbulence on a flight deck display.

15. The method of claim 13 further comprising causing a warning to be annunciated in response to the estimated vertical loading on the aircraft exceeding a threshold value.

16. A turbulence detection and display system, comprising:
a means for a receiving a time signal, radar data, an altitude signal, and an airspeed signal; and
a means for determining a signal representative of the presence of a turbulence threat based on the radar data and the time signal, the altitude signal, and the airspeed signal,
wherein the time signal is an elapsed time from completion of an initial climb, the completion of the initial climb being based on throttle position.

17. The system of claim 16, wherein the time signal comprises a UTC label received by a radar.

18. The system of claim 16, wherein the time signal is received from a timer.

19. The system of claim 16, wherein the time signal further comprises an elapsed time from takeoff, and takeoff is based on throttle position.

20. The system of claim 16, wherein completion of an initial climb is based on sensing completion of an initial climb.

* * * * *